UNITED STATES PATENT OFFICE 2,649,383

AZO PIGMENT AND COATING COMPOSITIONS CONTAINING THE SAME

Donald B. Killian, Nutley, N. J., and Albert D. Reidinger, Wilmington, Del., assignors to E. I. du Pont de Nemours & Company, Wilmington, Del., a corporation of Delaware No Drawing. Application May 3, 1950,
Serial No. 159,876

7 Claims. (Cl. 106—193)

This invention relates to novel azo pigments of deep red or maroon shades which are particularly adapted for use in producing durable type coating compositions employed in exterior finishes.

More specifically the invention relates to new pigments comprising the manganese salts of the azo dyestuffs derived from 2-amino-benzoic acids, substituted in the 4-position, coupled with 2-hydroxy-3-naphthoic acid, said pigments being particularly and outstandingly suited for use in the manufacture of certain types of coating compositions employed as automotive finishes.

Coating compositions used in the finishing of automotive vehicles and in similar applications in which durability of the film is required are generally of two types—(a) enamels formulated with synthetic resins such as the condensation products of glycerol and phthalic acid with drying oil acids, usually known as alkyds, and (b) lacquers formulated from solutions of a cellulosic derivative such as nitrocellulose. A further type comprises automotive finishes containing mixtures of synthetic resins and nitrocellulose.

To obtain pleasing decorative effects, the film is pigmented with a suitable colorant, which, it will be found, will influence the durability of the dry film in a number of ways. Of paramount importance is the ability of the pigmented film to retain its original color and gloss on exposure to the elements. Also essential is the freedom which the film must exhibit from any tendency to crack or check, the presence of which would enable corrosion of the underlying metal to occur and, in addition, would detract considerably from the decorative effect desired.

It was formerly thought that pigments utilized in these applications should be opaque in character in order that complete hiding would be attained with the fewest possible coats of enamel. However, recent trends in styling have introduced finishes containing metallic flakes, such as aluminum powder, combined with more transparent pigments to give unusual decorative effects. Many such finishes have remarkable brilliance in the sunlight and, particularly on a curved surface, exhibit a much-sought-after "two-tone" effect. The pleasing effects have been made even more striking with increased amounts of aluminum powder but pigments acceptable for use without aluminum exhibit in many instances a serious, undesired lack of color stability in its presence.

These deficiencies are particularly noted in the field of deep red or maroon finishes. Many pigments have been proposed for use in this field, some of which, despite their limitations, have enjoyed considerable commercial success. Useful pigments in this field may be divided into two groups, of which one includes certain azo pigment dyestuffs in which diazo components free of solubilizing groups are coupled to arylides of 2-hydroxy-3-naphthoic acid. Thus, the azo pigment obtained by coupling diazotized 3-nitro-4-amino toluene to the meta-nitro-anilide of 2-hydroxy-3-naphthoic acid may be cited. This pigment is relatively transparent, has a desirable yellowish undertone and gives pleasing effects when metallized. In lacquers it gives a relatively durable film of fair color stability with small amounts, say, 3 to 5%, of metal. However, it provides poor film durability in alkyds and its color stability is poor in any vehicle with amounts of metal above about 5%. Related azo pigments exist which give reasonably desirable films in alkyd but the whole class of compounds lacks color stability on exposure to sunlight with more than 5% of metal and, in addition, they have a small inherent solubility in oils and hydrocarbon solvents. This results in an undesirable discoloration or bleeding wherever the color film is overstriped or comes in contact with a white or light-colored enamel.

The other group of red or maroon pigments comprises that obtained by coupling certain azo compounds containing sulfonic groups with 2-hydroxy-3-naphthoic acid and precipitating the resulting dyestuff with a metallic salt, particularly the alkaline earth metals as barium or calcium, or, in some cases, manganese. These are inherently lacking in oil solubility and are free of any tendency to bleed in the solvents. Some provide relatively durable films under certain conditions of use. Thus, the manganese salts of the azo dyestuffs described in U. S. 2,225,665, comprising derivatives of 2-hydroxy-3-naphthoic acids coupled with various halogenated aniline or toluidine sulfonic acids, provide relatively durable and non-bleeding coating compositions of red to maroon shade. Although these pigments have enjoyed use in full shade, their film durability has not always been completely satisfactory. In addition, they do not lend themselves satisfactorily to metallization with either large or small amounts of metal because their relatively high opacity and bluish hue seriously limit the decorative effects which can be obtained. In common with all prior deep red or maroon pigments, their color stability shows serious failure in the presence of any considerable amount of aluminum.

It is among the objects of this invention, therefore, to overcome the above and other disadvantages which characterize prior maroon pigments, especially those employed in automotive finishes. Particular objects of the invention include: the provision of novel methods and means for producing durable coating compositions having the desirable characteristics referred to—namely, satisfactorily high in film durability, color stability, relative freedom from bleeding and high decorative value, especially in the presence of small or large amounts of metallic flakes, such as aluminum powder; and the production of novel, light-fast non-fading deep red or maroon shade azo pigments which are relatively insoluble in coating composition vehicles or thinners and usefully employable in coating compositions generally and particularly in automotive finishes of the synthetic resin or transparent metallized cellulosic type. An additional object is to provide a maroon type of pigment from which coatings having the desired characteristics mentioned can be readily obtained, but which, although in great demand, particularly in the automotive industry, have not previously been obtainable. Other objects and advantages of the invention will be apparent from the ensuing description of our invention.

These and other objects and advantages are attainable in this invention which embodies the unexpected discovery that the manganese salts of certain dyestuffs which result from the coupling of diazotized 2-amino-benzoic acids, substituted in the 4-position, with 2-hydroxy-3-naphthoic acid and corresponding to the formula:

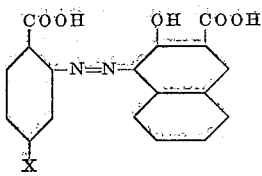

in which X represents a halogen (chlorine, bromine, iodine) or nitro group, are of outstanding value as pigments of maroon shade for use in coating compositions of the types mentioned.

In a more specific and preferred embodiment, the invention comprises providing as a novel pigment composition the manganese salt of the azo dyestuff corresponding to the formula:

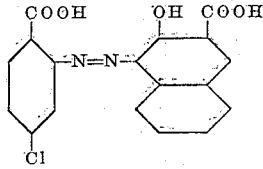

and utilizing such composition as an essential pigmenting ingredient for producing a transparent metallic automotive finish possessing excellent durability and color stability upon prolonged exposure to the elements.

In a practical application of the invention, the manganese salts of the azo dyestuffs contemplated can be readily prepared through conventional diazotization and laking methods, following which the pigment can be suitably and likewise conventionally incorporated in the coating formulation being prepared. Thus, such substituted 2-amino-benzoic acid components as 4-chloro-2-amino-benzoic acid, or 4-nitro-2-amino-benzoic acid, can be diazotized, after dissolution in a dilute solution of an alkali, such as sodium hydroxide, through the use of an acid such as hydrochloric acid, and a solution of sodium or other alkali metal nitrite. Coupling of the resulting diazo with an alkaline solution of 2-hydroxy-3-naphthoic acid is then effected, the resulting disodium or other alkali salt of the dye being then suitably isolated by filtration. The dyestuff thus obtained is then reacted under slightly acid, substantially neutral, or slightly alkaline conditions with a soluble salt of manganese such as the sulfate, chloride, acetate, etc. The precipitated pigment is then recovered by filtering, washed free from soluble salts, and dried. A suitable quantity thereof is then incorporated in a suitable automotive or other type of finish through compounding, grinding, or otherwise mixing the formulation in a conventional ball or other type mill and until dispersion of the pigment in the vehicle becomes substantially complete. Thus, the pigment may be milled or otherwise mixed, either in the presence or absence of suitable modifying agents, with a suitable automotive finish such as an alkyd resin enamel, modified alkyd resin enamel, phenol formaldehyde resin enamel, resin-modified phenol formaldehyde resin enamel, other suitable synthetic resin enamels or nitrocellulose or other cellulosic derivative, to obtain the desired maroon coating possessing the unexpected and unique properties which have been alluded to.

Finishes obtained from the pigment compositions described and vehicles of either the synthetic resin or the cellulose derivative types will be found to exhibit excellent durability and color stability when exposed to the elements. Furthermore, the transparent metallic finishes in which metallic powders, such as aluminum, are incorporated—for example, to the extent of 3–5% of the weight of the coloring ingredient—exhibit an appearance of brilliance and clarity of tone not heretofore obtained with other pigments derived from 2-hydroxy-3-naphthoic acid, either by coupling with halogenated aniline or toluidine sulfonic acids or with 2-amino benzoic acids substituted in other than the 4-position. Furthermore, the metal content can be increased to as much as 10% or even 20%, without incurring any significant loss in color stability. In marked contrast to this, no prior red or maroon pigment of practical utility exists which will tolerate appreciably more than 5% metal without serious loss in color stability. In addition, the present finishes will show relative freedom from bleed when overstriped with white enamel, which also is in marked contrast to the discoloration experienced with pigments derived from the arylides of 2-hydroxy-3-naphthoic acid heretofore employed in the coloration of metallized finishes of red to maroon shades.

To a more complete understanding of the invention, the following illustrative examples are given, in which the parts mentioned are by weight:

Example I 17.2 parts of 4-chloro-2-amino benzoic acid were dissolved at 50–60° C. in 250 parts of water containing 4.2 parts of sodium hydroxide. After cooling to 0° C., 7 parts of sodium nitrite dissolved in about 25 parts of cold water were added, followed by 10 parts of hydrochloric acid (100%). The diazo is then clarified, if required.

20 parts of 2-hydroxy-3-naphthoic acid were dissolved at 60° C. in 150 parts of water containing 8 parts of sodium hydroxide. 16 parts of sodium carbonate dissolved in 75 parts of warm water were then added and the mixture adjusted with ice to 10° C. at a volume equivalent to about 600 parts of water. The diazo solution was then added in about 30 minutes, and the resulting dyestuff formed was filtered off and washed with 5% salt solution until nearly free of alkali.

The isolated sodium salt of the dyestuff was re-slurried in 2500 parts of water. To the suspension were added in turn 3.6 parts of Para Soap dispersed in 20 parts of water, 7.5 parts of sodium acetate dissolved in 25 parts of water, and 25 parts of manganese sulfate (100%) dissolved in 165 parts of warm water, followed by 1.8 parts of sodium hydroxide (100%). The slurry was then heated to the boil and boiled for 2 minutes, after which the pigment was filtered, washed and dried.

The resulting maroon pigment was found to be deeper and more intense in full shade lacquer, more intense and transparent in the metallized finish and stronger, more intense in tint, and of better color stability on exposure to sunlight than a product obtained from 5-chloro-2-amino benzoic acid by the same process.

*Example II*

18.2 parts of 4-nitro-anthranilic acid were dissolved at about 50° C. in 500 parts of water with 4.2 parts of sodium hydroxide. After adjusting to a volume equivalent to 800 parts of water at about 30° C., 7 parts of sodium nitrite were added. The mixture was then run into 10 parts of hydrochloric acid (100%), the temperature of which was maintained at 0-2° C. by the addition of ice. After stirring for a short time the diazo was filtered from insoluble impurities.

The clarified diazo was coupled to 20 parts of 2-hydroxy-3-naphthoic acid as in Example I. The resulting dyestuff suspension was heated to a boil, 40 parts of 5% sodium rosinate solution added, and the mixture boiled for 30 minutes. The sodium salt was isolated by filtering and washing with 5% salt solution and was then converted to the manganese toner by the method of Example I. The pigment thus obtained was deeper and more intense in full shade lacquer and exhibited greater intensity and transparency in metallized finish than the product obtainable from 5-nitro-2-amino benzoic acid.

*Example III*

An alkyd resin coating composition having the following formulation was prepared with the pigment of Example I to obtain a synthetic maroon enamel:

| | Per cent |
|---|---|
| Maroon pigment | 9.63 |
| Alkyd resin solutions (50% solids) (drying oil modified) | 81.60 |
| Petroleum spirits | 8.02 |
| Lead naphthenate drier (24%) | 0.50 |
| Cobalt naphthenate drier (6%) | 0.25 |
| | 100.00 |

This enamel was prepared by ball milling a portion of the resin solution and solvents with the pigment, and effecting admixture of the remaining ingredients with the resulting mill base at a later stage.

Steel panels coated with the resulting enamel after exposure to weathering for 6 months exhibited excellent durability and color retention and showed no checking and cracking or other physical failure of the film, whereas the same type of enamel but pigmented with the metallized product of coupled 5-chloro-2-amino benzoic acid with 2-hydroxy-3-naphthoic acid showed poor color stability under the same conditions.

*Example IV*

A metallic maroon enamel of the following composition:

| | Per cent |
|---|---|
| Synthetic maroon enamel (Example III) | 98.75 |
| Aluminum metal paste, 40% (containing 60% inert hydrocarbon [mineral spirits] solvent) | 1.25 |
| | 100.00 | was prepared by thoroughly mixing these two ingredients to assure homogeneity, with the addition of more solvent, as required. The pigment composition of the resulting enamel consisted of:

| | Per cent |
|---|---|
| Maroon pigment (Example I) | 95 |
| Metallic aluminum | 5 |
| | 100 |

This metallic maroon enamel, when coated on steel panels and exposed to the weather and direct sunlight for 6 months, showed excellent durability properties with no physical film failure and substantially no change in color, in contrast to a similar enamel containing the coupled 5-chloro-2-amino-benzoic acid isomer referred to in Example III, which exhibited severe fading after exposure under the same conditions and for the same period of time.

*Example V*

A typical cellulose nitrate coating composition, employing the pigment of Example I to obtain a maroon lacquer, was made up of the following composition:

| | Per cent by weight |
|---|---|
| Maroon pigment (as in Example I) | 5.7 |
| Cellulose nitrate—¼ sec.-visc | 5.3 |
| Cellulose nitrate—½ sec.-visc | 5.3 |
| Non-drying alkyd resin sol'n 60% | 21.1 |
| Dibutyl phthalate | 2.1 |
| Blown castor oil | 1.1 |
| Butyl acetate | 20.4 |
| Ethyl acetate | 6.9 |
| Toluol | 19.1 |
| Butyl alcohol | 6.6 |
| Ethyl alcohol | 6.4 |
| | 100.0 |

This coating was prepared by dispersing the pigment in the resin-plasticizer portion of the final mixture together with sufficient solvent to permit working the mass in a ball mill. The remaining ingredients were then incorporated by simple agitation in a paddle mixer, to give a homogeneous product.

Steel panels coated with the resulting maroon lacquer after exposure to weathering as in Example III exhibited similar durability and color retention characteristics and showed no evidence of checking, cracking, or other type of film failure.

A metallized lacquer was also prepared by adding a suitable amount of aluminum paste as in Example IV to the maroon lacquer of this example so as to give a final pigment composition of 95% maroon pigment and 5% powdered aluminum. Steel panels coated with this metallized maroon lacquer after exposure to weather and direct sunlight for 6 months showed excellent durability properties with no physical film failure and remarkable stability of color in contrast to a similar enamel containing the 5-chlor-2-aminobenzoic acid isomer which exhibited severe fading after exposure under the same conditions.

As will be apparent, suitable variance in the invention can be resorted to without departing from its underlying spirit and scope, and it is not to be constructed as limited to the specific embodiments mentioned, except as defined in the appended claims. Thus, while illustrated in its application to the preparation of conventional automotive lacquers or alkyd resin finishes, the invention is also adaptable to the production of coatings, especially enamels, utilizing any oil-modified synthetic resins, such as melamine or urea-formaldehyde modified drying oil alkyds, melamine or urea-formaldehyde non-oxidizing oil alkyds, and the like, and nitrocellulose lacquers or oil type paints or finishes, as generally referred to in U. S. Reissue Patent 21,247 and U. S. Patent 2,225,665. The novel pigments of this invention are outstandingly useful in the production of stable, durable synthetic resin enamel or lacquer coatings, especially automotive finishes of the transparent type which contain commercial aluminum powder or other useful inert metallic flake or powder material possessing a high degree of light reflectance, such as copper bronze, stainless steel, or nickel powders or flakes. These compositions can be prepared by dispersing the pigment in synthetic resin or like vehicles and by means of the customary paint grinding procedure, as in a ball, roller, or other type of mechanical mill, with suitable modification of the mill base. Resinated coating compositions containing an alkyd resin are well-known to the art and comprise various polyhydric alcohol-polybasic acid resins, especially the so-called modified polyhydric alcohol-polybasic acid resins or resinous condensation products. Similarly contemplated for use are conventional cellulose nitrate vehicles in which natural resins, softeners and plasticizers, such as dibutyl phthalate or castor oil, or both, are present as essential components, as well as cellulose nitrate compositions containing appreciable proportions of synthetic resins such as those of the modified alkyd types already mentioned.

It is already known that pigments may be derived from 2-hydroxy-3-naphthoic acid and as a result of coupling, for example, 2-aminobenzoic acid (anthranilic acid) and certain substituted aniline carboxylic acids. Among such prior art pigments are those derived by coupling 2-hydroxy-3-naphthoic acid with 5-chloro-2-amino-benzoic acid or 5-nitro-2-amino-benzoic acid. However, these pigments, in the form of either their calcium or other alkaline earth metal salts, or as manganese salts, are unsuitable for use in the production of durable coating compositions, and more especially automotive finishes. This is due either to their inherent lack of necessary transparency, their known failure to withstand prolonged exposure to asmospheric conditions, poor color stability, the very dull shades which they provide, or to a combination of these undesirable attributes.

In the present invention is has been found that quite surprisingly and wholly unexpectedly the manganese salts of the dyestuffs obtained by coupling certain diazotized 4-position substituted 2-amino-benzoic acids with 2-hydroxy-3-naphthoic acid afford unique pigments exhibiting the special and desired characteristics above mentioned, and that when employed in automotive finishes overcome the disadvantages characterizing prior maroons. It is our further discovery that not only is the invention critical to coupled 2-hydroxy-3-naphthoic acid with the diazotized 2-amino-benzoic acid components hereinabove mentioned, but that only their manganese salts are utilizable in attaining the benefits and results of the invention. That is, their other metal salts such as those of barium, calcium, lead, etc., will be found to prove non-useful for the purposes of this invention.

We claim as our invention:

1. As a new insoluble azo maroon pigment, the manganese salt of the azo dyestuff having the formula:

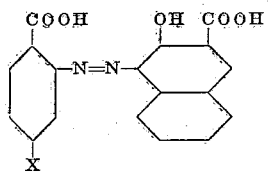

in which X is a substituent selected from the group consisting of halogen and nitro.

2. As a new insoluble azo maroon pigment, the manganese salt of the azo dyestuff having the formula:

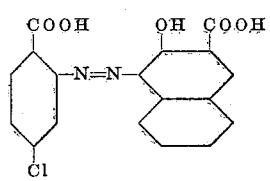

3. A durable automotive finish coating composition containing as pigmenting ingredients a minor proportion of metal flake and a major proportion of the manganese salt of the insoluble azo maroon dyestuff having the formula:

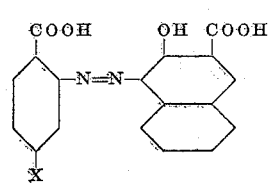

in which X is a substituent selected from the group consisting of halogen and nitro.

4. A durable synthetic alkyd resin coating composition containing as pigmenting ingredients a minor proportion of powdered aluminum and a major proportion of the manganese salt of the insoluble azo maroon dyestuff having the formula:

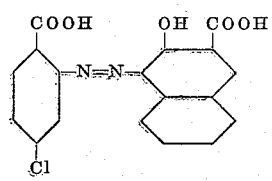

5. A durable automotive finish coating composition containing a nitro cellulose vehicle and as pigmenting ingredients therefor a minor proportion of powdered aluminum and a major proportion of the manganese salt of the insoluble azo maroon dyestuff having the formula:

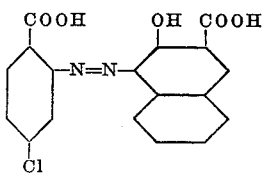

6. A durable automotive finish coating composition containing a nitro cellulose vehicle and as pigmenting ingredients therefor a minor proportion of powdered aluminum and a major proportion of the manganese salt of the insoluble azo maroon dyestuff having the formula:

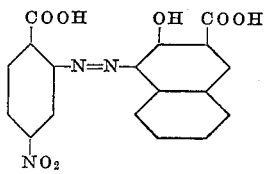

7. As a new insoluble azo maroon pigment, the manganese salt of the azo dyestuff having the formula:

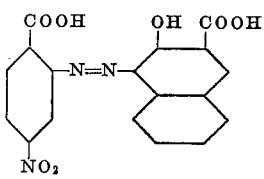

DONALD B. KILLIAN.
ALBERT D. REIDINGER.

References Cited in the file of this patent

UNITED STATES PATENTS

| Number | Name | Date |
|---|---|---|
| 942,916 | Konig | Dec. 14, 1909 |
| 1,795,764 | Stubner | Mar. 10, 1931 |
| 2,200,445 | Fellmer | May 14, 1940 |
| 2,225,665 | Siegel | Dec. 24, 1940 |
| 2,287,053 | Murphy | June 23, 1942 |
| 2,326,001 | Ariotti et al. | Aug. 3, 1943 |
| 2,326,623 | Crosby | Aug. 10, 1943 |
| 2,444,034 | Collings | June 29, 1948 |
| 2,506,130 | Bam et al. | May 2, 1950 |
| 2,508,447 | Cooper | May 23, 1950 |

FOREIGN PATENTS

| Number | Country | Date |
|---|---|---|
| 1,695 | Great Britain | of 1867 |
| 58,271 | Germany | July 24, 1891 |
| 219,500 | Germany | Mar. 2, 1910 |
| 165,083 | Great Britain | July 13, 1922 |